April 2, 1957   C. B. LUNDSTROM   2,787,306
SHUTTLE BLOCK AND METHOD OF FORMING SAME
Filed Dec. 19, 1952   2 Sheets-Sheet 1

INVENTOR
Carl Brynolf Lundstrom
BY Dodge and Sons
ATTORNEYS

April 2, 1957 C. B. LUNDSTROM 2,787,306
SHUTTLE BLOCK AND METHOD OF FORMING SAME
Filed Dec. 19, 1952 2 Sheets-Sheet 2

INVENTOR
Carl Brynolf Lundstrom
BY
ATTORNEYS

2,787,306

Patented Apr. 2, 1957

2,787,306

SHUTTLE BLOCK AND METHOD OF FORMING SAME

Carl Brynolf Lundstrom, Herkimer, N. Y.; Helen W. Lundstrom, Carl William Lundstrom, and David Brynolf Lundstrom, executors of said Carl Brynolf Lundstrom, deceased Application December 19, 1952, Serial No. 326,830

10 Claims. (Cl. 144—309)

This invention relates to a process of forming and strengthening hollow wooden articles. Specifically it relates to the production of hollow wooden articles in which the walls of the cavities are relatively thin and are subject to wear.

It is well known that the wear and impact resistance and the strength per unit of area of wood may be increased by exposing the wood to the action of hot vapors, in a process referred to as "plasticization," and then compressing the wood while at the same time heating it to soften the lignin of the wood. It has been proposed to use this basic method in the production of various wooden articles. Where a compressed article is to be used as a component part of a precise working mechanism, it is of paramount importance that the dimensions of the article are stable. If an article is produced by machining a blank compressed as suggested above, it has been found that the resulting product lacks the requisite dimensional stability for use in precise mechanisms. It is believed that this dimensional instability may be attributed to two factors. One is the partial release of the unrelieved stresses set up by the compression of the blank during the machining operation. A second cause appears to be the fact that the pores in the outer surfaces of the blank are reduced or closed during compression. The pores exposed during the machining of the blank are not reduced to the same extent. As a result of this variable pore size the transfer of moisture across the different surfaces of the article occurs at different rates and warping or curling of the article results.

According to the present invention these two sources of dimensional instability in a compressed article are overcome. The method is applicable to various wooden articles, but will be described as it is applied to loom shuttles and rifle fore ends.

As is well known a loom shuttle comprises an elongated body pointed as each end and having a central bobbin cavity. The dimensions of this cavity must be closely maintained, but the walls of the cavity are desirably made as thin as possible to keep down the weight of the shuttle and permit making the bobbin cavity as large as possible. The dimensions of such shuttles are fairly standard and must conform to requirements of the looms used in the textile industry. The thin walls of the shuttle cavity are subjected on their outer faces to rather severe wear during their travel across the shuttle race and the shuttle race back. It has been proposed in the past to make such shuttle blocks by machining or trimming a compressed solid block. Such shuttles are not entirely satisfactory, because the bobbin cavities routed out after compression of the block lack dimensional stability, and the proper mounting of the bobbin therein was difficult.

According to the present invention, shuttle blocks having extraordinary dimensional stability and wearing qualities, as well as the resiliency required for long service of shuttles made from these blocks, can be produced as follows: A rigid filler piece or core, which may be referred to as an arbor, is provided to fit the bobbin cavity formed in an oversized wooden shuttle blank. The core is assembled in the cavity of the blank, and the assembly then is placed and heated between heated elements of a suitable press. Through these press elements a pressure sufficient to compress or densify the heated wood is applied to opposite sides of the blank in a direction to press the opposite side walls of the cavity against the intervening core. The core preferably is made of a metal such as aluminum or other material having good heat conducting properties, so that the relatively thin wall sections pressed against it may be heated through and brought to an evenly heated condition at their inner surfaces, as well as their outer surfaces, to soften the lignin in the wood. In the course of the compression, the core sustains the desired dimensions of the cavity while the fibers of the heated wood, where the lignin is softened, are compacted together by the applied pressure. When the desired densification is obtained, the heating is discontinued and the article is cooled under continued pressure, so that the lignin is hardened while the wood fibres are retained in their compacted form.

The core is arranged to "float" in the course of the compression of the blank, in the sense that it is positioned by the blank itself so that it is free to be displaced with displacements of the wood engaging it in either of the effective directions of the pressure applied to the outer sides of the blank. Thus, the pressure transmitted to the core through either of the opposite side walls of the cavity is applied through the core equally to the inner surface of the other of said walls, and the side walls are compressed similarly from their opposite inner surfaces through this "floating" action of the core or arbor while they are being compressed similarly from their outer sides by the direct action of the press elements.

By virtue of the present method, the wood forming the side walls of the bobbin cavity in the shuttle block is greatly increased in density and hardness and greatly reduced in porosity, along and inwardly from both the outer and the inner surfaces of the compressed cavity walls. The solid end portions of the shuttle block are also compressed from their outer surfaces, but the degree of density and hardness imparted to them is less than that of the cavity side walls, due to the fact that the greater thickness and heat insulation of the wood in the solid end portions limits the extent of the heating and softening of the lignin therein and the extent of compression therein per unit of thickness.

The method may also be applied to the forming of wooden articles having a cavity which does not extend through the article in the direction of motion of the press in which it is formed. As an example of the application of the method to this type of article, it will be described as it is used in the formation of the fore end of a rifle. The term fore end as used in this specification refers to that part of a rifle which is reciprocated to actuate the cocking or loading mechanism of a rifle or shot gun.

The method will be described further hereinafter as it is used in these two specific applications and having reference to the accompanying drawings, in which.

Figure 7:
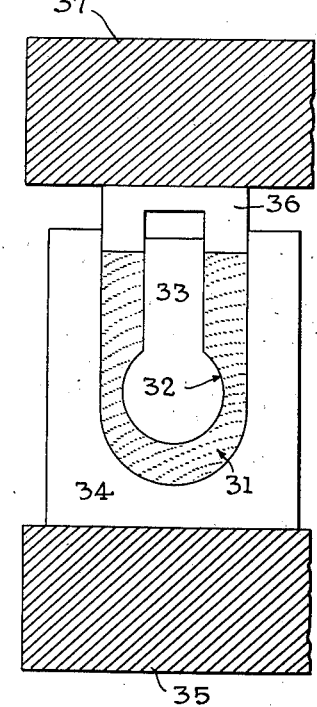
Figure 8:
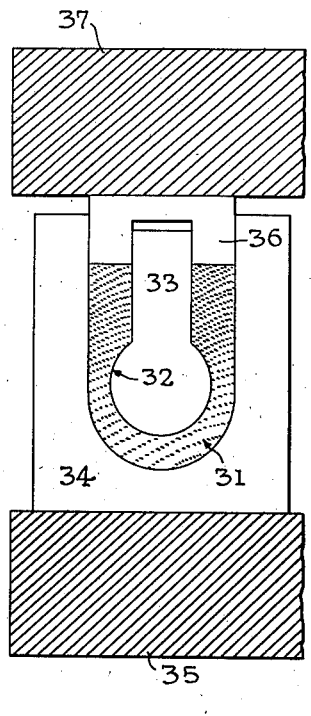
Figure 9:
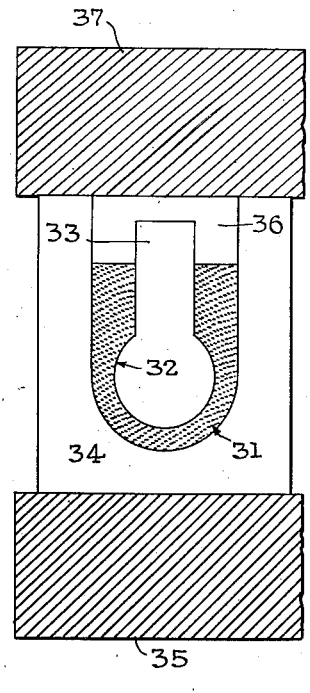

Figures 7, 8, and 9 are end elevations partly in section of the blank and the press at different stages during compression.

Figure 1:
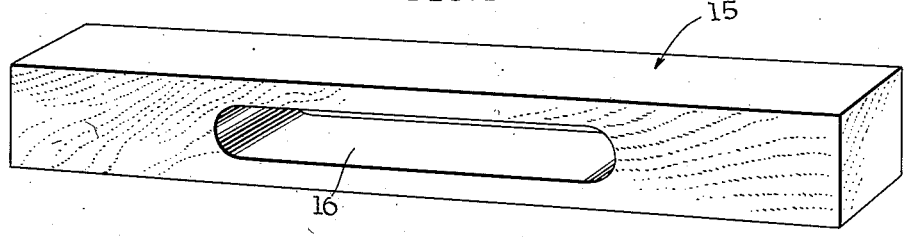
Figure 1 is a perspective view of the blank from which a shuttle block may be made.
Figure 2:
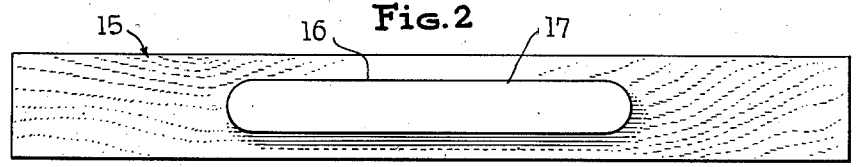
Figure 2 is a side elevation thereof with the core in place.
Figure 3:
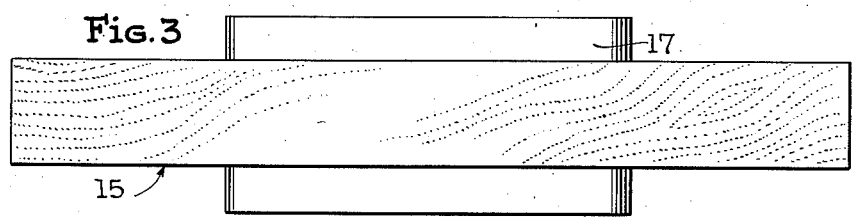
Figure 3 is a plan view of the blank and the core inserted therein.

Referring first to Fig. 1, reference numeral 15 indicates generally a blank from which a shuttle block is made. The blank 15 is generally rectangular in transverse section and is provided with a cavity 16 which extends from side to side therethrough. The cavity 16 is generally rectangular in outline and may be rounded at its opposite ends. The cavity 16 is parallel to the upper and lower faces of the blank 15 and is equidistant from them. As is shown in Figures 2 and 3, a core 17 is placed in the cavity 16 and fills it.

Figure 4:
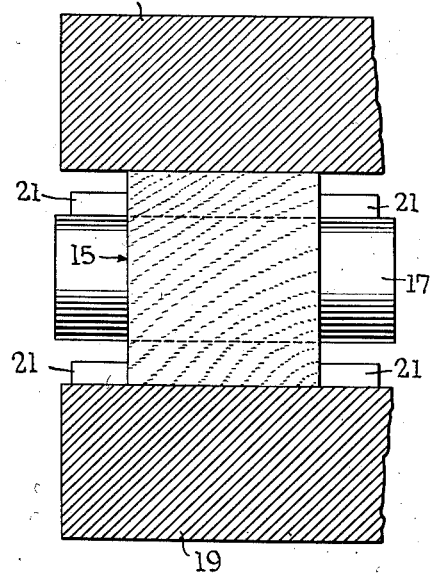
Figures 4 and 5 are end views partly in section showing the blank between the platens of a press prior to and after compression respectively.

As indicated in Fig. 4, blank 15 is placed between the platens 18 and 19 of a suitable press. During compression of the article to its final dimensions platens 18 and 19 are heated. After compression the platens are cooled in order that the lignin will set and hold the fibers in their compacted position. The heating and cooling may be performed by admitting steam and cold water respectively to the cored passages in the platens. Since this is conventional practice these passages are not shown. Four spacer strips 21 are mounted as illustrated in Fig. 4 and serve to position the core relatively to the platens 18 and 19 in such a way that the thicknesses of the thin wall sections of the cavity 16 are equal to each other in the compressed shuttle block.

Figure 5:
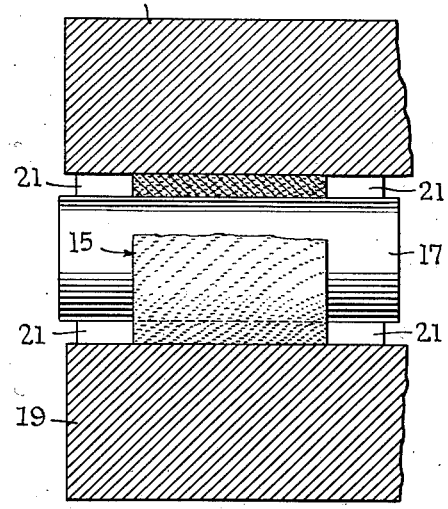

As shown in Fig. 5 the shuttle blank, after it has been compressed, has upper and lower faces which are hardened and the hardening of the thin walls adjacent to the cavity 16 is greater than the hardening of the solid butt ends of the blank.

Figure 6:
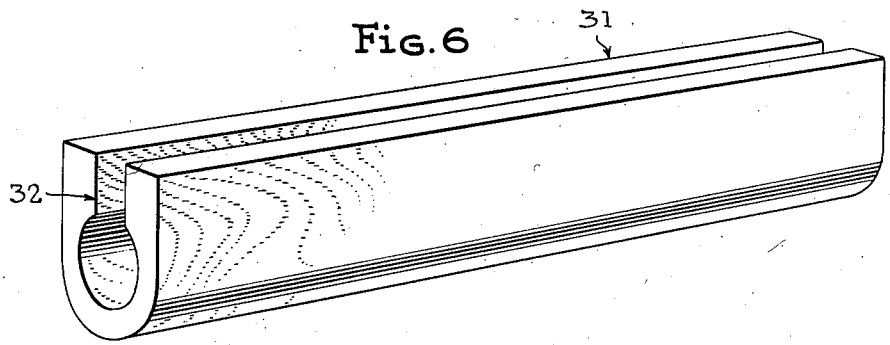
Figure 6 is a perspective view of a blank from which the fore end of a rifle may be made.

In Fig. 6 is shown a blank 31 from which the fore end of a rifle may be formed. This blank is generally U-shaped and includes a central axial cavity 32. The cavity 32 is generally keyhole-shaped in outline.

As shown in Fig. 7 an elongated axial core 33 is placed in the cavity 32 and the blank 31 together with the core 33 are placed within a suitable outer mold 34 which has a cavity which conforms to the outer surface of the blank 31. The mold 34 rests on the upper surface of a heated press platen 35 and is heated thereby. Resting on the upward extending legs of the blank 31 are the legs of a generally channel shaped filler piece 36 upon which the upper press platen 37 bears during compression of the blank 31. The compression of the blank 31 is clearly illustrated in Figs. 7, 8, and 9, Fig. 7 showing the arrangement of the parts prior to compression and Fig. 9 showing the arrangement of the parts after compression had been completed. Fig. 8 shows an intermediate stage of compression.

Refer again to Figs. 1 through 5 relating to the forming of a shuttle block. The blank prior to insertion between the platens 18 and 19 is exposed to the action of hot vapors, so as to effect a preliminary "plasticization" of the wood. Then the oversized blank is placed between the heated platens 18 and 19 which are brought downward into contact with the blank 15 and the thin walls of the cavity 16 are heated through. This through heating of the thin wall sections is materially aided by the core 17 which is made of a material such as aluminum which is a good conductor of heat. The heating of this thin wall section together with the action of the moisture which is contained in the wood causes the lignin to be softened whereby the wood is rendered more or less plastic so that during deformation, the wood fibers are more or less freely movable. During the deformation the wood fibers are closely compacted in the thin wall section. Thus, the wood itself is compressed or densified. The article is cooled by admitting water to the passages in the platens 18 and 19. This results in the lignin being set so that the wood fibers are securely held in their compacted position. Upon the removal of the core from the cooled article, one obtains a densified shuttle block that is readily convertible into an improved loom shuttle having excellent wearing properties and dimensional stability.

The compression of the ends of the blank 15 is of a different character from that of the thin cavity walls, because the central portion of the wood in the solid end portions is heated to a lesser extent so that the wood in this region has its lignin content less completely softened or plasticized. The surface portions adjacent to platens 18 and 19 are plasticized. During compression the wood fibers are compacted and the hardness of the resulting wood is greater than the hardness of the wood in its natural state. The hardness of the end portions is not, however, as great as that of the thin wall section adjacent the cavity 16. The wood fibers in the central portion of the butt ends are slightly compacted and this compacting of the wood fibers becomes greater in planes nearer the upper and lower surfaces of the blank. Hardness readings taken on a shuttle block compressed according to the present invention indicate that a wood which has an initial hardness in the neighborhood of 60 will be compressed so that the hardness of the thin wall sections adjacent the cavity 16 is approximately 90, whereas the hardness on the upper and lower surfaces of the end sections is in the neighborhood of 80. These hardness readings are stated on the scale obtained by using a type D Shore Dormeter hardness tester.

The fact that the end portions of the blank are not densified to the same extent as the thin wall sections is important from a practical point of view because the blank from which the block is made is not shaped so that the compressed article will have the final dimensions of a shuttle. It must be trimmed and shaped to afford the pointed ends characteristic of loom shuttles. These portions are dimensionally stable even though they are machined after compression, because the compression in these portions is not severe and hence there is only a slight tendency to set up unrelieved stresses of any magnitude.

The filler strips 21, two of which rest on the upper surface of the core 17 and two of which rest on the upper surface of the platen 19 are provided so that the core 17 will be positioned at the end of the compression in such a way that the thickness of the thin wall sections on opposite sides of the cavity 16 will be equal. These spacer strips 21 also serve in conjunction with core 17 to determine the final thickness and degree of densification of the shuttle block by limiting closure of the platens 18 and 19.

As shown in Figs. 6, 7, 8, and 9 the apparatus used to carry out the method as applied to the fore end of a rifle is somewhat different but the general principles and the method followed are the same.

It will be noted, as is shown in Fig. 7, that the core 33 is not positively positioned relatively to the platens during the compression of the blank. During the initial stages of the compression the flanges of the channel shaped filler piece 36 compress the legs of the blank 31. Since the legs of the blank bear against the bulbous part of the rigid core 33 in the direction of the compressive force, the compression of the legs in turn tends to carry the core 33 downward and causes it to compress the portion of the blank 31 which lies beneath the core 33. Thus the rigid core serves as a "floating" arbor which is free to be displaced with displacements of the wood engaging it in the course of the compression or densification of the blank. The compressive force transmitted to either side of it through one wall portion of the blank is applied through the core equally to the inner surface of the opposite wall portion of the blank. In this way, the opposite wall portions are densified similarly from their opposite inner surfaces while they are being densified similarly from their opposite outer surfaces by the direct compressive action of the heated press elements, i. e., of mold 34 and filler piece 36 in Figs. 7 to 9. A similar manner of operation occurs in the embodiment of Figs. 4 and 5, wherein the core 17 is free to be displaced with the wood engaging it and serves to bring about the densification of the side walls of the bobbin cavity 16 from their opposite inner surfaces similarly, while they are being densified similarly from their opposite outer surfaces by the direct compressive action of the heated platens 18 and 19.

The initial compression of the lower portion of the blank 31 will be obvious from consideration of the change of dimensions of the blank, as shown in Fig. 7 and as shown in Fig. 8. As the compression of the blank 31 is carried toward completion the upper end of the core 33 comes in contact with the web of the channel member 36 and the core is moved to a final position which has a definite positional relationship in the mold 34. It will be seen that the filler piece 36 serves the dual purpose of sustaining the upward extending legs of the blank 31 against buckling during compression and of guiding the core 33 to its final position so that the wall thickness of the resulting articles is symmetrical about the vertical longitudinal median plane.

The lignin in the blank is softened throughout the blank 31 during the forming steps by means of the heat transferred therethrough between the mold 34 and the core piece 33. Hence the wood fibers are compacted in each section of the wall. The dimensions of the blank are preferably chosen so that the wood fibers are equally compacted throughout the entire work piece.

It will be seen that in the described examples of the practice of the present method, the regions of the blank which are severely compressed are formed to their final dimension. As a result good dimensional stability is assured. Dimensional stability is further assured by the high degree of softening or plasticization of the thin walls which assures that both the inner and outer surfaces of the wall sections bordering the cavity or recess in the article are characterized by uniform reduction or closure of the pores. Thus the factors believed to contribute to dimensional instability are taken into account and their ill effects eliminated to a great degree.

To assure a complete understanding of the practice of the invention it may be mentioned that in a suitable example the temperature of the thin wall sections during compression is between 300° and 350° Fahrenheit. The block is subjected to a pressure of approximately two thousand p. s. i. The entire heating and compression cycle takes approximately 10 minutes for completion.

It will be apparent that the core or insert could itself be directly heated. When a directly heated core is used the thickness of the wall sections which can be plasticized throughout can be somewhat greater than can be accommodated when the core is not directly heated.

Preferably the blanks to be formed according to the present invention are made from wood which has been seasoned, i. e. it has been dried either in the open air or in a kiln. The moisture required to soften the lignin is provided by exposing the blank to hot vapors, for example steam, although the vapors which may be used are not limited to the use of steam. The method may be employed to form blanks which are made of green or partially seasoned wood and in such cases the pretreatment of the blank can be omitted. In this case the moisture which is present in the wood serves as the plasticizing agent when the blank is subjected to heat and pressure.

It will be understood that the foregoing examples of the practice of this invention are illustrative and that the invention may be practiced in other ways and utilized for the production of other articles, within the scope of the appended claims.

What is claimed is:

1. The method of forming a hardened wooden article having a relatively thin walled cavity therein, which comprises placing in the cavity of an oversized wooden blank a rigid core of heat conducting material fitting said cavity, heating said blank and applying to opposite sides thereof a pressure directed toward said core and sufficient to compress the heated wood, said core sustaining the desired dimensions of said cavity under pressure, thereby compressing opposite walls of said cavity from outer and inner surfaces thereof simultaneously, and cooling the compressed blank under continued pressure.

2. The method of forming a hardened wooden article having a relatively thin walled cavity therein, which comprises placing in the cavity of an oversized blank of wood a rigid core of heat conductive material fitting said cavity, moistening the blank, heating opposite faces of the moist blank and applying thereto a pressure directed toward said core and sufficient to compress the heated wood, said core sustaining the desired dimensions of said cavity under pressure, thereby compressing opposite walls of said cavity from outer and inner surfaces thereof simultaneously, and cooling the compressed blank under continued pressure.

3. A solid wooden article having a walled cavity formed therein, the wood of opposite side walls of said cavity being compressed evenly over opposite inner and outer surfaces of said walls and having along each of said surfaces a substantially greater density and hardness than the other wood of the article.

4. A wooden shuttle block having an elongated bobbin cavity formed therein, the wood of opposite side walls of said cavity being compressed over both the inner and the outer surfaces of said walls and having along each of said surfaces a substantially greater density and hardness than the other wood of the block.

5. A wooden shuttle block having an elongated bobbin cavity formed therein, the wood of opposite side walls of said cavity being compressed over both the inner and the outer surfaces of said walls and having along each of said surfaces a substantially greater density and hardness than the other wood of the block, the inner and outer surfaces of each of said walls having approximately the same degrees of density and hardness.

6. A wooden shuttle block having an elongated bobbin cavity formed centrally therein, said block having opposite outer surfaces extending from end to end thereof and opposite inner surfaces extending along the sides of said bobbin cavity, the wood of said block being compressed and substantially increased in density and hardness over each of said outer surfaces and also over each of said inner surfaces, the hardness of said outer and inner surfaces along said cavity being substantially greater than the hardness of said outer surfaces at the ends of the block.

7. The method of forming a hardened hollow wooden article, which comprises placing in the cavity of an oversized hollow blank of compressible wood a substantially incompressible core fitting said cavity, said blank comprising at opposite sides of said cavity wall portions having respective inner surfaces arranged to bear oppositely against opposite sides of said core, applying pressure to opposite outer surfaces of said wall portions in opposite directions extending through said inner surfaces and said core, said pressure being sufficient to compress said wood, in the course of the compression positioning said core by the blank itself so that the core is free to be displaced in either of said directions with displacements of the wood engaging it, whereby the pressure transmitted through either of said wall portions to said core is applied equally through the core to the inner surface of the opposite wall portion, and limiting the relative displacement of said core and each of said outer surfaces at a predetermined relative position of the same to obtain a predetermined extent of compression of each of said wall portions.

8. The method of forming a hardened hollow wooden article, which comprises placing in the cavity of an oversized hollow blank of compressible wood a substantially incompressible core fitting said cavity, said blank comprising at opposite sides of said cavity wall portions having respective inner surfaces arranged to bear oppositely against opposite sides of said core, heating said wall portions to soften lignin in the wood, applying pressure to opposite outer surfaces of said wall portions in opposite directions extending through said inner surfaces and said core, said pressure being sufficient to compress said heated wood, in the course of the compression positioning said core by the blank itself so that the core is free to be displaced in either of said directions with displacements of the wood engaging it, whereby the pressure transmitted through either of said wall portions to said core is applied equally through the core to the inner surface of the opposite wall portion, and limiting the relative displacement of said core and each of said outer surfaces at a predetermined relative position of the same to obtain a predetermined extent of compression of each of said wall portions.

9. The method of forming a hardened hollow wooden article, which comprises placing in the cavity of an oversized hollow blank of compressible wood a substantially incompressible core fitting said cavity, said blank comprising at opposite sides of said cavity wall portions having respective inner surfaces arranged to bear oppositely against opposite sides of said core, simultaneously heating and applying pressure to opposite outer surfaces of said wall portions in opposite directions extending through said inner surfaces and said core, said pressure being sufficient to compress said heated wood, in the course of the compression positioning said core by the blank itself so that the core is free to be displaced in either of said directions with displacements of the wood engaging it, whereby the pressure transmitted through either of said wall portions to said core is applied equally through the core to the inner surface of the opposite wall portion, limiting the relative displacement of said core and each of said outer surfaces at a predetermined relative position of the same to obtain a predetermined extent of compression of each of said wall portions, and cooling the compressed blank under continued pressure.

10. The method of forming a shuttle block, which comprises assembling in the bobbin cavity of an oversized wooden shuttle blank a substantially incompressible core fitting said cavity so that the opposite side walls of said cavity will bear over their respective inner surfaces against opposite sides of said core, heating said blank to soften lignin in the wood, applying pressure to the outer surfaces of said walls in opposite directions extending through said inner surfaces and said core, said pressure being sufficient to compress the heated wood, in the course of the compression positioning said core by said walls so that the core is free to be displaced in either of said directions with displacements of said inner surfaces, whereby the pressure transmitted through either of said walls to said core is applied equally through the core to the opposite of said walls, and limiting the relative displacement of said core and each of said outer surfaces at a predetermined relative position of the same to obtain a predetermined extent of compression of each of said walls.

References Cited in the file of this patent

UNITED STATES PATENTS

| | | |
|---|---|---|
| 1,382,852 | Pittman | June 28, 1921 |
| 2,108,920 | Humiston | Feb. 22, 1938 |
| 2,586,308 | Curtis | Feb. 19, 1952 |